(12) United States Patent
Jahn et al.

(10) Patent No.: US 8,967,627 B2
(45) Date of Patent: Mar. 3, 2015

(54) INTERSHAFT SEAL

(75) Inventors: Ingo H. J. Jahn, Derby (GB); Gavin M. Rowntree, Derby (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 13/188,993

(22) Filed: Jul. 22, 2011

(65) Prior Publication Data

US 2012/0043725 A1 Feb. 23, 2012

(30) Foreign Application Priority Data

Aug. 19, 2010 (GB) .................................. 1013844.4

(51) Int. Cl.
*F16J 15/34* (2006.01)
*F02C 7/28* (2006.01)
*F01D 11/00* (2006.01)

(52) U.S. Cl.
CPC . *F02C 7/28* (2013.01); *F01D 11/00* (2013.01); *F01D 11/003* (2013.01); *F16J 15/3472* (2013.01); *F16J 15/3484* (2013.01); *F16J 15/3488* (2013.01)
USPC ....................................................... 277/352

(58) Field of Classification Search
USPC .......................... 277/352, 361, 370, 371, 393
See application file for complete search history.

(56) References Cited

U.S. PATENT DOCUMENTS

| | | | | |
|---|---|---|---|---|
| 3,658,349 A | * | 4/1972 | Stevens et al. | 277/392 |
| 3,863,935 A | * | 2/1975 | Batch | 277/352 |
| 4,211,424 A | * | 7/1980 | Stein | 277/352 |
| 4,754,984 A | * | 7/1988 | Keba | 277/350 |
| 4,972,986 A | * | 11/1990 | Lipschitz | 277/361 |
| 5,344,164 A | * | 9/1994 | Carmody et al. | 277/371 |
| 6,086,069 A | * | 7/2000 | Bedford | 277/380 |
| 6,196,790 B1 | * | 3/2001 | Sheridan et al. | 415/111 |
| 6,224,061 B1 | * | 5/2001 | Roddis | 277/370 |
| 6,273,527 B1 | * | 8/2001 | Yamaguchi et al. | 303/116.4 |
| 6,916,022 B2 | * | 7/2005 | Auber | 277/512 |
| 6,932,348 B2 | * | 8/2005 | Takahashi | 277/359 |
| 8,100,403 B2 | * | 1/2012 | Short | 277/345 |
| 2010/0164180 A1 | | 7/2010 | Short | |
| 2011/0250056 A1 | * | 10/2011 | Munson | 415/170.1 |
| 2012/0043725 A1 | * | 2/2012 | Jahn et al. | 277/306 |

FOREIGN PATENT DOCUMENTS

GB 1 565 018 A 4/1980
WO WO 2010/030448 A1 3/2010

OTHER PUBLICATIONS

Search Report issued in British Application No. GB1013844.4 dated Nov. 8, 2010.

* cited by examiner

*Primary Examiner* — Vishal Patel
*Assistant Examiner* — L. Susmitha Koneru
(74) *Attorney, Agent, or Firm* — Oliff PLC (57) ABSTRACT

An intershaft seal for inner and outer coaxial shafts which rotate relative to each other. The seal is located in an annular space between the shafts and maintains an axial pressure differential between a fluid pressure on the first side of the seal and a fluid pressure on the other, second side of the seal. The seal comprises a sealing ring which is coaxial with the shafts and which forms a sealing contact with the outer shaft to maintain the pressure differential.

14 Claims, 6 Drawing Sheets

INTERSHAFT SEAL

The present invention relates to an intershaft seal for inner and outer coaxial shafts which rotate relative to each other.

Figure 1:
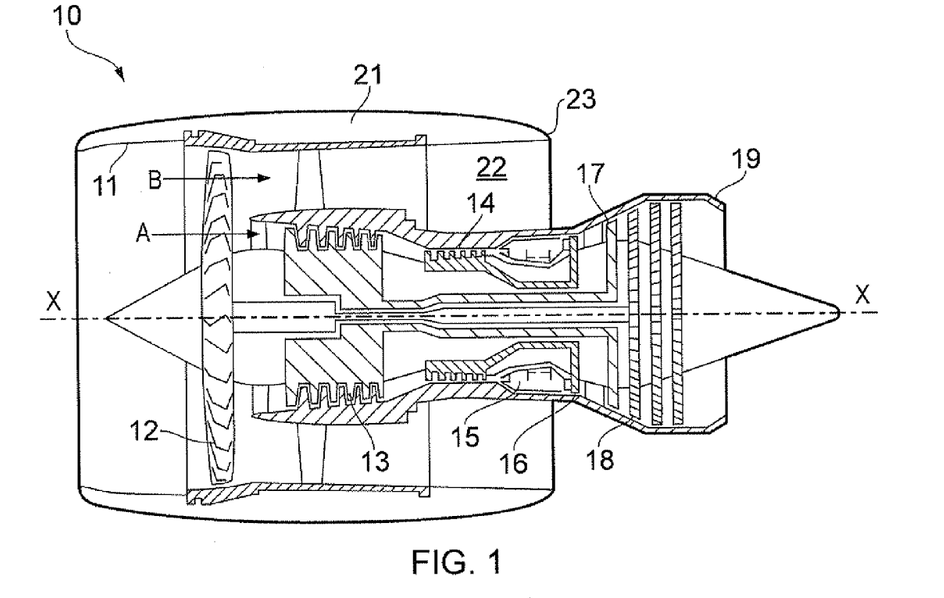
FIG. 1 shows a schematic longitudinal cross-section through a gas turbine engine.

With reference to FIG. 1, a ducted fan gas turbine engine generally indicated at 10 has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, and intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

The gas turbine engine 10 works in a conventional manner so that air entering the intake 11 is accelerated by the fan 12 to produce two air flows: a first air flow A into the intermediate pressure compressor 14 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

Numerous types of seal are used in such engines. One type of intershaft seal is shown schematically in FIG. 2 and is used to seal between gas, liquid or air-gas mixtures. The seal is located between inner 37 and outer 38 coaxial shafts and maintains an axial pressure differential between high pressure fluid 31 on a first side of the seal and low pressure fluid 32 on a second side of the seal. The shafts rotate relative to each other. The seal comprises a carbon ring 35 positioned between first 33 and second 34 runners on respectively the first and second sides of the seal. The carbon ring has a slight interference fit with the outer shaft. The two runners are separated by a spacer 36, so that the axial gap between the runners is slightly longer than the axial length of the carbon ring. During operation, the carbon ring is pushed by centrifugal forces into more intimate sealing contact with the outer shaft and rotates with that shaft. First 39 and second 40 annular sealing interfaces are created between the runners and the axially spaced first 46 and second 47 end faces of the ring. The sealing interfaces provide only a small axial clearance between each end face and the respective runner.

Figure 2:
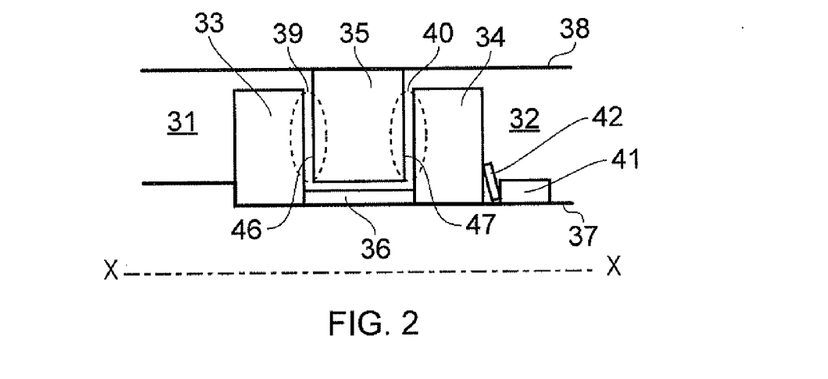
FIG. 2 shows a schematic longitudinal cross-section through an intershaft seal having a unitary sealing ring.

The series of first runner 33, spacer 36 and second runner 34 is axially restrained relative to the inner shaft 37 by a ring nut 41 (or similar device) which axially clamps these components against a step formation on the inner shaft. Optionally a Belville spring 42 may be used to set the clamping load.

During axial movement transients, rubbing contact at the respective sealing interface 39, 40 can occur, such rubbing contact producing sufficient axial force to overcome the frictional resistance to sliding axial movement of the carbon ring 35 along the outer shaft 38. Wear of the seal occurs due to rubbing at the end faces 46, 47 of the carbon ring where these contact with the runners 33, 34. Thus an improvement to this technology is the incorporation of lift generating formations, such as V-grooves, in the surfaces of the runners at the sealing interfaces. Such formations generate lift as the axial clearance of the sealing reduces. Ideally this lift can be sufficiently strong such that no axial rubbing contact occurs under normal operation.

When the carbon ring 35 is midway between runners 33, 34, the seals formed by both sealing interfaces 39, 40 can be inadequate, leading to excessive fluid leakage across the seal. However, reducing the distance between the runners is generally not possible, as provision has to be made for thermal expansion of the ring and manufacturing tolerances. Thus a development of the intershaft seal, shown schematically in FIG. 3, has the ring split into two halves 43, 44 with a spring element 45 (e.g. a wave spring) positioned between the two halves and urging the halves towards respectively the first runner and the second runner. If this arrangement is combined with lift generating formations, the axial clearances of both sealing interface can be kept to a low level (e.g. as low as 2-5 microns). Any thermal expansion and build tolerance imperfections can be compensated for by compression of the spring element.

Figure 3:
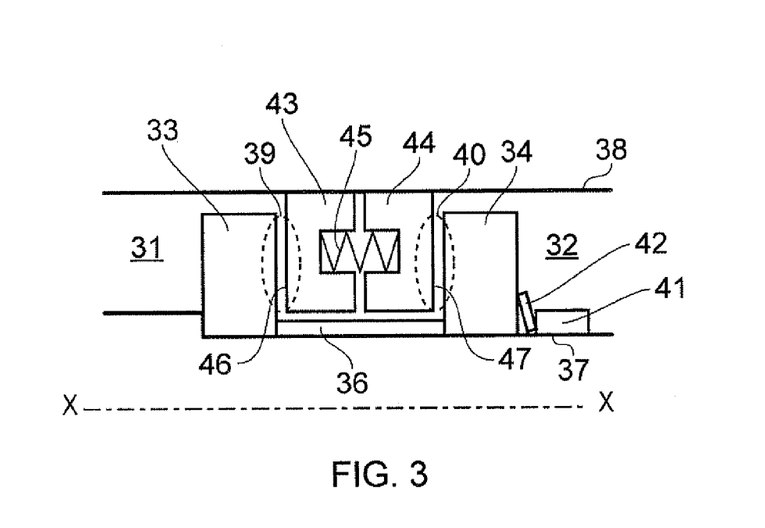
FIG. 3 shows a schematic longitudinal cross-section through an intershaft seal having a split sealing ring.
Figure 4A:
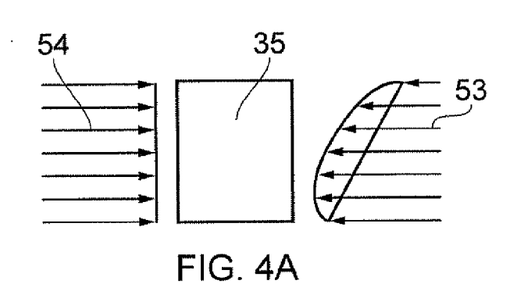
FIG. 4 shows schematically (a) pressure distributions acting on the sealing ring of the seal of FIG. 2, and (b) pressure contributions acting on the right hand side of the sealing ring.
Figure 4B:
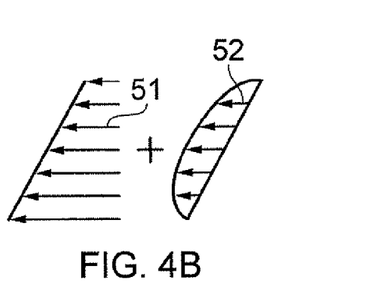

A problem with the seals of FIGS. 2 and 3, however, is that they are pressure drop limited. The limit arises because the entire axial pressure drop acting on the seal is carried by the carbon ring 35 or one of the half carbon rings 43, 44. FIG. 4(a) shows schematically the pressure distributions acting on the carbon ring of the seal of FIG. 2 when high fluid pressure is to the left of the seal and low fluid pressure is to the right. In FIG. 4(a) the ring has moved to the right, and the pressure 54 acting over the entire first end face 46 of the ring is the same as that of the high pressure fluid 31 to the left of the seal due to the consequently large axial clearance of the sealing interface 39. At the second end face 47 of the ring, the axial clearance of the sealing interface 40 is small and the pressure 53 acting over the second end face varies from a value at the inner edge of the interface which is approximately the same as the pressure acting over the entire left end face to a value at the outer edge of the interface which is the same as that of the low pressure fluid 32 to the right of the seal. As shown in FIG. 4(b), the total pressure 53 acting over the right end face derives from two sources, a static pressure 51 acting on the right end face and a pressure 52 due to the generated lift. For a seal without lifting generating formations, the same analysis applies, but pressure 52 tends towards zero.

Figure 5:
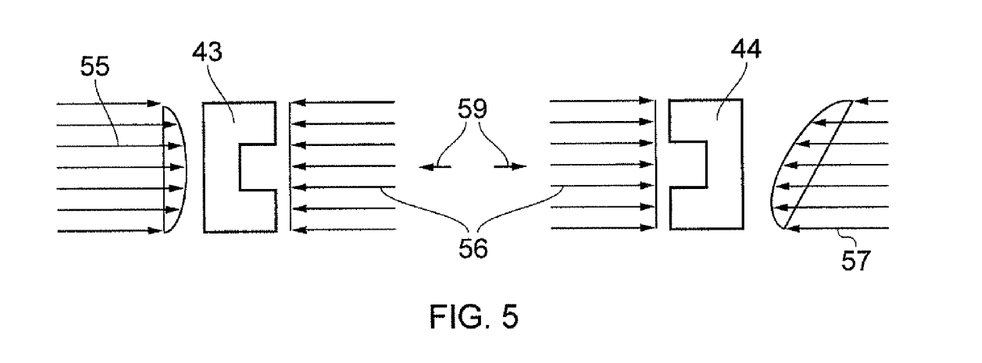
FIG. 5 shows schematically pressure distributions acting on the sealing ring halves of the seal of FIG. 3.

FIG. 5 shows schematically corresponding distributions acting on both halves 43, 44 of the carbon ring of FIG. 3. Again high fluid pressure is to the left of the seal and low fluid pressure is to the right. The spring element 45 produces outwardly directed forces 59 which combine with respective static back pressures 56 on the inner faces of the ring halves. Unlike the seal of FIG. 2, this arrangement maintains a small clearance at the left sealing interface 39, so that the pressure 55 acting over the first end face 46 of the ring includes a contribution from generated lift. The pressure 57 acting over the second end face 47 of the ring is like pressure 53 of FIG. 4(a).

As can be understood from FIGS. 4 and 5, at large axial pressure differentials it becomes difficult to match the pressure distributions acting on the carbon ring 35 or on the half carbon ring 44. To attain pressure balance in the seal of FIG. 2, the pressure acting from the left (upstream pressure 54) has to be matched with the pressure acting from the right (pressure dropping from high to low 51+generated lift pressure 52). Likewise, to attain pressure balance in the seal of FIG. 3, the pressure acting on half carbon ring 43 from the left (upstream pressure+generated lift pressure 55) has to be matched with the pressure acting from the right (back pressure 56+spring force 59) and the pressure acting on half carbon ring 44 from the left (back pressure 56+spring force 59) has to be matched with the pressure 57 acting from the right (pressure dropping from high to low+generated lift pressure). As the pressure drop across the seal increases, rubbing contact between the ring 35 or ring half 44 and the runner 34 can only be avoided by increasing the generated lift pressure at the right sealing interface 40. However, there is a limit on the amount of generated lift pressure that can be produced.

In the case of seals without lift generating formations, rubbing contact exists from the start and the pressure mismatch is translated into large contact pressures which can lead to excess carbon wear.

Accordingly, an aim of the present invention is to provide an intershaft seal which can be pressure balanced at higher pressure differentials.

Thus, in a first aspect, the present invention provides an intershaft seal for inner and outer coaxial shafts which rotate relative to each other, the seal being located in an annular space between the shafts and maintaining an axial pressure differential between a fluid pressure on the first side of the seal and a fluid pressure on the other, second side of the seal, the seal comprising:

a sealing ring which is coaxial with the shafts and which forms a sealing contact with the outer shaft to maintain the pressure differential, the ring having first and second axially spaced end faces, and first and second runners which project outwardly from and extend circumferentially around the inner shaft and which sandwich the ring therebetween, the first runner forming a first annular sealing interface with the first end face of the ring and the second runner forming a second annular sealing interface with the second end face of the ring, the outer edge of each sealing interface being at the pressure of the fluid on the respective side of the seal;

wherein the first end face of the ring is stepped such that an inboard portion of the first end face is axially spaced from an outboard portion of the first end face and the ring has an outwardly facing surface therebetween, the first annular sealing interface being formed by the first runner with the inboard portion of the first end face, one or more fluid passages extending from the second end face to the outboard portion of the first end face to produce a fluid pressure on the outboard portion of the first end face which is equal to the fluid pressure on the second side of the seal, and the sealing contact of the ring with the outer shaft being formed at the outwardly facing surface to maintain the pressure differential between the fluid pressure on the outboard portion of the first end face and the fluid pressure on the first side of the seal.

By stepping the first end face of the ring and tying the fluid pressure on the outboard portion of the first end face to the fluid pressure on the second side of the seal, the pressure load on the ring can be balanced at higher differentials between a relatively high fluid pressure on the first side of the seal and a relatively low fluid pressure on the second side of the seal. Equally, if the differential is reversed such that the higher fluid pressure is on the second side of the seal, the seal can still function adequately, as the consequently high fluid pressure on the outboard portion of the first end face will tend to be neutralised by a correspondingly high fluid pressure in the second annular sealing interface.

The seal may have any one or, to the extent that they are compatible, any combination of the following optional features.

Both shafts may rotate in the same direction, or one shaft may counter-rotate relative to the other shaft. Alternatively, only one of the shafts may rotate and the other shaft may be stationary.

Typically, the inner edges of the sealing interfaces are at substantially equal pressures. That is, there may be little or no pressure differential between the inner edges of the sealing interfaces.

The sealing ring may be a unitary body. Alternatively, the sealing ring may have a first half which provides the inboard portion of the first end face and a second half which provides the outboard portion of the first end face and the second end face, the first and second halves being spring loaded relative to each other such that they are urged towards respectively the first and second runners. Thus, when the sealing ring has first and second halves, the axially spaced, inboard and outboard portions of the first end face are each provided by different halves.

Preferably the sealing ring is formed of carbon. Particularly with a carbon sealing ring, the sealing contact at the outwardly facing surface may be formed by direct contact between that surface and the outer shaft. However, optionally, the outwardly facing surface may incorporate secondary sealing elements, such as O-rings, spring energised PTFE seals, bellow type seals or piston rings.

Typically, in use, the sealing ring is urged centrifugally into the sealing contact with the outer shaft at the outwardly facing surface of the ring. The sealing ring may have an end-to-end radial slit formed therein which can facilitate radial expansion of the ring when it is urged centrifugally into the sealing contact with the outer shaft. Additionally or alternatively, such a slit can facilitate radial contraction of the ring, thereby reducing or limiting excessive interference between the ring and the outer shaft. When the ring has first and second halves, the slit may be formed in either or both of the halves. The slit may follow a straight end-to-end path. Preferably, however, the slit follows an end-to-end path which has at least one circumferentially extending section. Opposing faces of the ring or ring half can thus confront each other across this section and maintain a sliding contact with each other as the ring expands or contracts, thereby reducing fluid leakage along the slit.

Conveniently, the one or more fluid passages are formed in the ring. However, another option is for the passages to be formed in the outer shaft. Typically, the sealing ring has a second outwardly facing surface between the outboard portion of the first end face and the second end face, the second outwardly facing surface also making contact with the outer shaft. By forming the fluid passages in the ring or the outer shaft, more reliable fluid pressure equalisation across the outboard portion of the first end face and the second end face can be assured. However, a further option is to form the one or more fluid passages in the interface between the second outwardly facing surface and the outer shaft, e.g. by axially extending grooves formed in either or both of the interface surfaces, or merely by engineering a non-sealing interface between the second outwardly facing surface and the outer shaft.

Preferably, the, or each, fluid passage extends from a position on the second end face which is radially outwards of the second annular sealing interface. In this way, the fluid pressure on the outboard portion of the first end face can be more reliably equalised with the fluid pressure on the second side of the seal.

Preferably, the first and/or the second sealing interface is configured to generate, in use, fluid-dynamic lift which prevents or reduces sliding contact between the ring and the respective runner across the interface. For example, at the interface, formations such as grooves can be provided in the surface of the respective runner to generate the lift.

Typically, the outer shaft is stepped to accommodate the stepped first end face of the ring.

In a second aspect, the present invention provides the sealing ring of the intershaft seal of the first aspect.

In a third aspect, the present invention provides coaxial inner and outer shafts fitted with the intershaft seal of the first aspect. For example, the shafts can be, generally counter-rotating, gas turbine engine drive shafts (in which case the seal is typically maintaining an axial air pressure differential across the seal), or the shafts can be components of a gas turbine engine bearing chamber (in which case the seal is typically maintaining a pressure between an air-oil mix on one side and air on the other side).

In a fourth aspect, the present invention provides the use of the intershaft seal of the first aspect for maintaining an axial pressure differential between a relatively high fluid pressure on the first side of the seal and a relatively low fluid pressure on the other, second side of the seal, the seal being located in an annular space between inner and outer coaxial shafts which rotate relative to each other.

Embodiments of the invention will now be described by way of example with reference to the accompanying drawings in which:

FIGS. 13($a$) and ($b$) are views from A-A in FIG. 12 of two possible configurations of an end-to-end slit in the ring or ring half.

Figure 6:
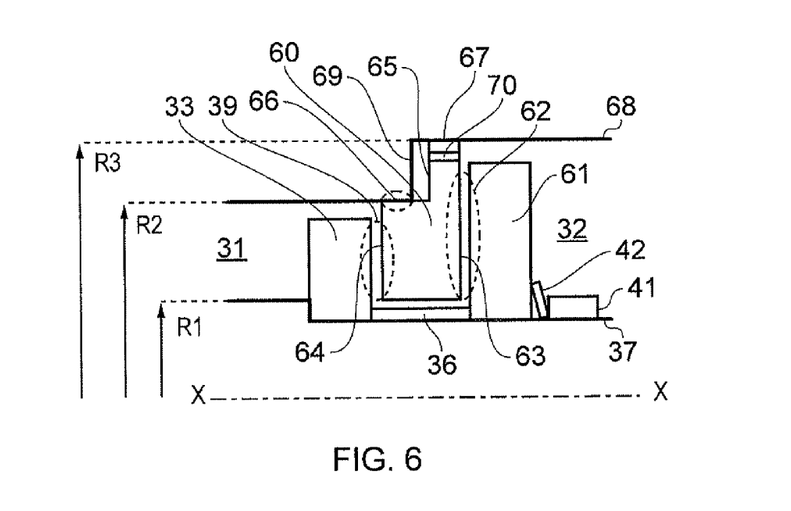
FIG. 6 shows a schematic longitudinal cross-section through an intershaft seal having a unitary sealing ring and with improved pressure balancing capability.

FIG. 6 shows schematically an intershaft seal with improved pressure balancing capability. Features of the seal of FIG. 6 found in the seal of FIG. 2 share the same reference numbers. The seal is located in the annular space between inner 37 and outer 68 coaxial shafts, which, in use, rotate relative to each other. The seal maintains a pressure differential between a high pressure fluid 31 on a first side of ring and low pressure fluid 32 on a second, axially spaced side of the ring. The seal comprises a carbon ring 60 which is coaxial with the shafts and which is sandwiched on its first and second sides between respectively a first runner 33 and a second runner 61. The runners project outwardly from and extend circumferentially around the inner shaft. The runners are separated by a spacer 36, and the series of first runner, spacer and second runner is axially restrained relative to the inner shaft by a ring nut 41 which axially clamps these components against a step formation on the inner shaft, with a Belville spring 42 optionally setting the clamping load.

Unlike the seal of FIG. 2, however, the carbon ring 60 of the seal of FIG. 6 has a stepped first end face. More particularly, the first end face has an inboard portion 64 and an outboard portion 65, with the outboard portion being closer to the second end face 63 of the ring than the inboard portion. Between the inboard and the outboard portions, the ring has a first outwardly facing surface 66, and between the outboard portion and the second end face the ring has a secondly outwardly facing surface 67. Relative to the ring 35 of FIG. 2, the outer radius of the ring 60 of FIG. 6 is increased to produce the outboard portion and an enlarged second end face. Further, the outer shaft 68 has a step formation 69 to accommodate the stepped first end face of the ring.

A first annular sealing interface 39 is formed between the first runner 33 and the inboard portion 64 of the first end face of the ring. A second annular sealing interface 62 is formed between the second runner 61 and the second end face 63. Thus the second sealing interface has a larger area than the first sealing interface. Lift generating formations are provided in the surfaces of the runners at the sealing interfaces.

A fluid passage 70 extends across the ring 60 from a position on the second end face 63 outboard of the second sealing interface 62 to a position on the outboard portion 65 of the first end face. This passage causes the fluid pressure on the outboard portion to be equal to that of the low pressure fluid 32. During operation, the ring is pushed by centrifugal forces into intimate sealing contact with the outer shaft 68 at the first outwardly facing surface 66. Thus the pressure differential is maintained between the fluid pressure acting on the outboard portion and the pressure of the high pressure fluid 31. Any contact between the secondly outwardly facing surface 67 and the outer shaft should not prevent the sealing contact at the first outwardly facing surface.

Figure 7:
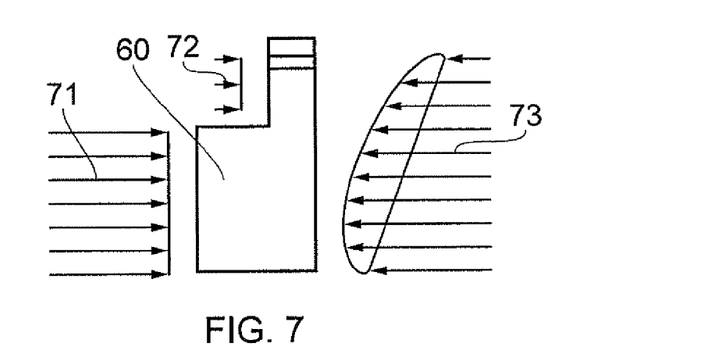
FIG. 7 shows schematically pressure distributions acting on the sealing ring of the seal of FIG. 6.

R1, R2 and R3 are respectively the radii of the inner shaft 37, the outer shaft to the high pressure side of the step formation 69, and the outer shaft to the low pressure side of the step formation. As shown in FIG. 7, high pressure 71 acts on the first end face of the ring 60 only between the two radii R1 and R2 (i.e. over the inboard portion 64 of the first end face), while low pressure 72 acts on the first end face between radii R2 and R3 (i.e. over the outboard portion 65 of the first end face). In contrast, on the second end face 63 of the ring, the combination 73 of the generated lift pressure and static pressure (varying from an inner value which is approximately the same as the pressure acting on the first end face between R1 and R2 to an outer value which is the same as that of the low pressure fluid 32) acts over the entire region between R1 and R3. Thus by reducing the area ratio A1/A2, where $A1=\pi(R2^2-R1^2)$ and $A2=\pi(R3^2-R1^2)$, the magnitude of the hydrodynamic lift needed to avoid rubbing contact can be reduced, even at high pressure differentials.

However, if the pressure differential is reversed, such that the higher pressure is to right in FIG. 6, then the seal can still be pressure balanced without rubbing contact, although with a lower limit on the highest pressure differential that can be sustained before rubbing contact occurs. More particularly, high pressure acts on and balances out on both sides of the ring 60 from R2 to R3. From R1 to R2, then, the pressure balance is similar to that experienced over the entire radius of the ring 35 of FIG. 2 and FIG. 4 (although, of course, relative to FIG. 4, because of the reversed pressure differential the pressure 54 would be on the right and the pressure 53 would be on the left.

Figure 8:
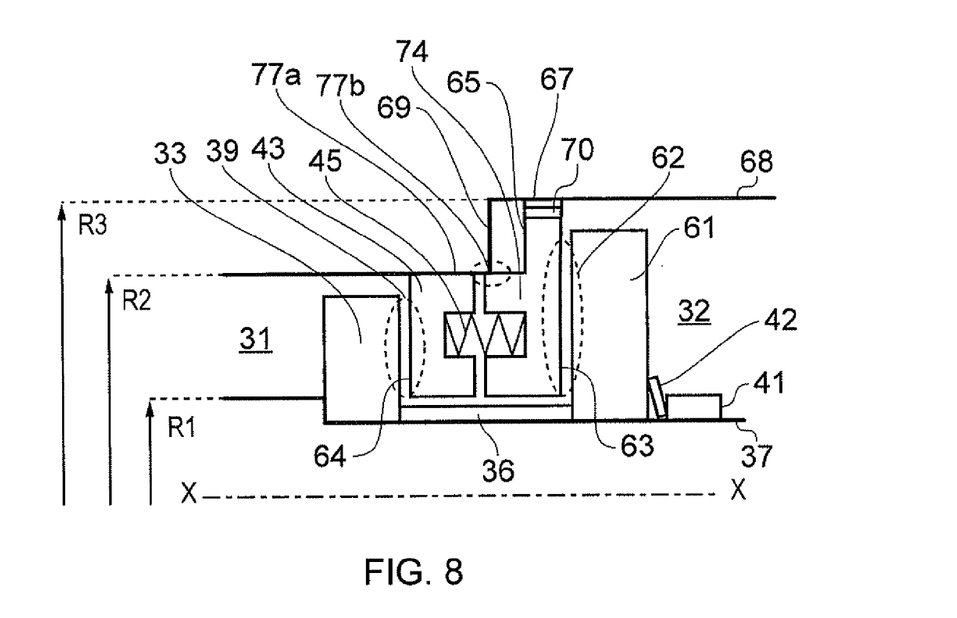
FIG. 8 shows a schematic longitudinal cross-section through an intershaft seal having a split sealing ring and with improved pressure balancing capability.

FIG. 8 shows schematically a development of the intershaft seal of FIG. 6, in which the ring is split into two halves 43, 74 with a spring element 45 (e.g. a wave spring) positioned between the two halves and urging the halves towards respectively the first runner 33 and the second runner 61. Features of the seal of FIG. 8 found in the seals of FIGS. 3 and 6 share the same reference numbers. As in FIG. 6, the ring of the seal of FIG. 8 has a stepped first end face. However, the inboard portion 64 of the first end face is formed by the first half ring and the outboard portion 65 of the first end face is formed by the second half ring. Between the inboard and the outboard portions, the ring has a first outwardly facing surface, a first part 77a of the first outwardly facing surface being formed by the first half ring, and a second part 77b of the first outwardly facing surface being formed by the second half ring. Sealing contact of the ring with the outer shaft 68 is made at the second part of the first outwardly facing surface. It is less critical for the first part of the first outwardly facing surface to make sealing contact with the outer shaft as the pressure of the high pressure fluid 31 is in any event transmitted to the cavity between the halves of the ring via the first sealing interface 39 and a gap between the spacer 36 and the ring.

By adopting the split ring, axial clearances of both sealing interfaces 39, 62 can be kept to a low level and any thermal expansion and build tolerance imperfections can be compensated for by compression of the spring element 45. However, advantages of the seal of FIG. 6 are still maintained. Thus, by reducing the area ratio A1/A2 the magnitude of the hydrodynamic lift needed to avoid rubbing contact can be reduced, and if the pressure differential is reversed, the seal can still be pressure balanced without rubbing contact.

Figure 9:
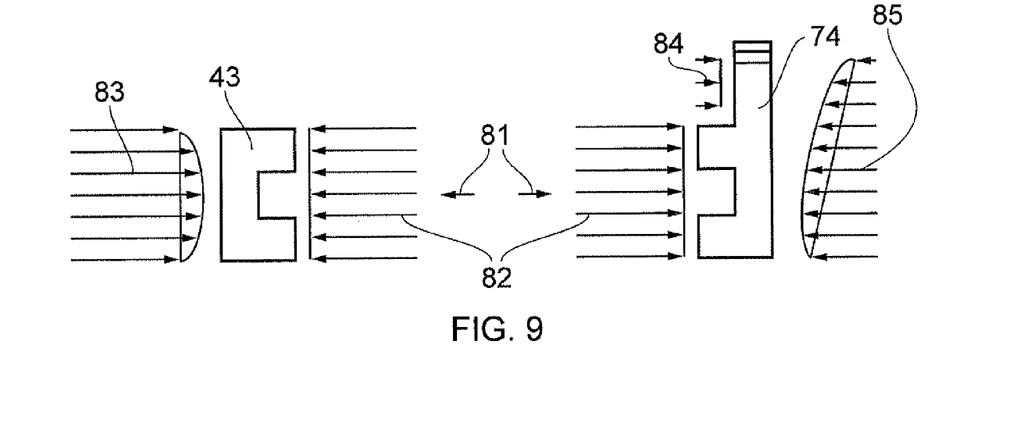
FIG. 9 shows schematically pressure distributions acting on the sealing ring of the seal of FIG. 8.

FIG. 9 shows schematically pressure distributions acting on both halves 43, 74 of the carbon ring of FIG. 8. The spring element 45 produces outwardly directed forces 81 which combine with respective static back pressures 82 on the inner faces of the ring halves. The high pressure 83 acting over the inboard portion 64 of the first end face of the ring includes a contribution from generated lift, while low pressure 84 acts over the outboard portion 65 of the first end face. The pressure 85 acting over the second end face 63 of the ring is like pressure 73 of FIG. 6.

Figure 10:
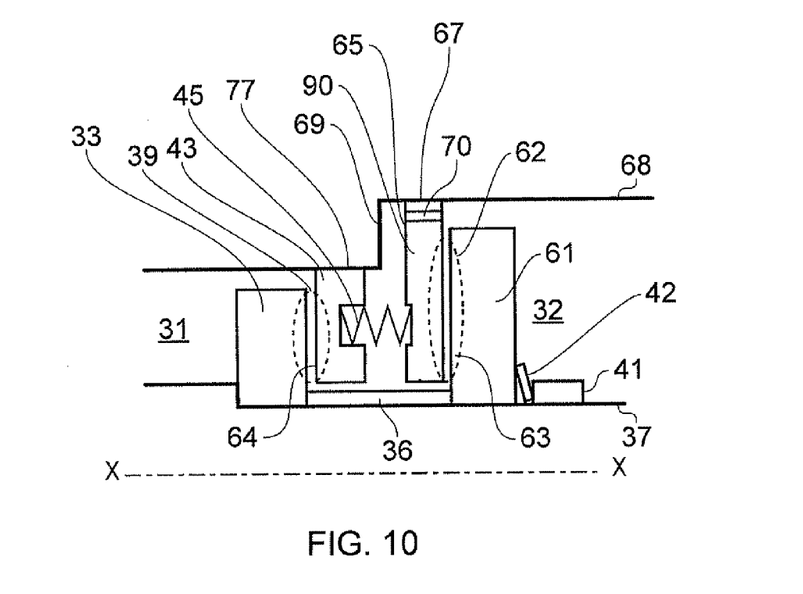
FIG. 10 shows a schematic longitudinal cross-section through another intershaft seal having a split sealing ring and with improved pressure balancing capability.

FIG. 10 shows schematically a development of the intershaft seal of FIG. 8. Features of the seal of FIG. 10 found in the seal of FIG. 8 share the same reference numbers. As in FIG. 8, the ring of the seal of FIG. 10 has a stepped first end face. The inboard portion 64 of the first end face is formed by the first half ring 43 and the outboard portion 65 of the first end face is formed by the second half ring 90. Between the inboard and the outboard portions, the ring has a first outwardly facing surface 77. This surface differs from the two-part corresponding surface 77a, 77b of the seal of FIG. 8 in that it is only formed by the first half ring. Sealing contact of the ring with the outer shaft 68 is made by the first half ring at the first outwardly facing surface. Thus, unlike the seal of FIG. 8, the pressure in the cavity between the halves of the ring is the same as the pressure on the outboard portion of the first end face, which in turn is equal to that of the low pressure fluid 32.

Figure 11:
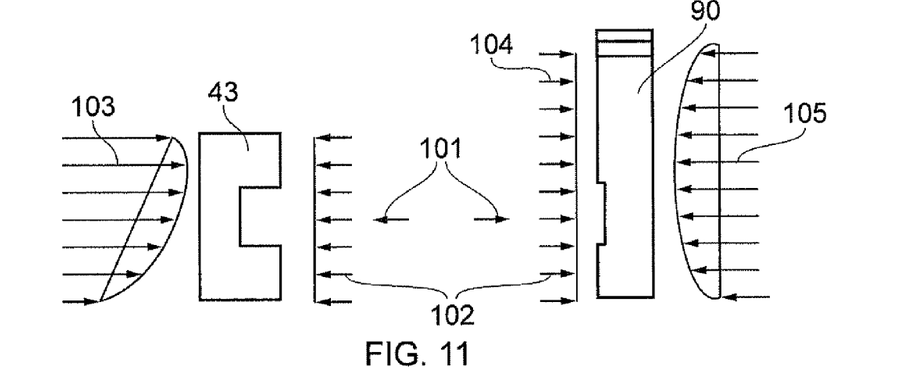
FIG. 11 shows schematically pressure distributions acting on the sealing ring of the seal of FIG. 10.

FIG. 11 shows schematically pressure distributions acting on both halves 43, 90 of the carbon ring of FIG. 10. The spring element 45 produces outwardly directed forces 101 which combine with respective low static back pressures 102 on the inner faces of the ring halves, and, in respect the second half ring 90, also combine with low pressure 104 acting on the outboard portion 65 of the first end face. A combination 103 of generated lift pressure and static pressure (varying from an outer value which is the same as that of the high pressure fluid 31 to an inner value which is approximately the same as the low static back pressure 102) acts over the inboard portion 64 of the first end face. A combination 105 of generated lift pressure and low static pressure (which is the same as that of the low pressure fluid 32) acts over the second end face 63. Thus the generated lift pressure at the second annular sealing interface 62 is transmitted to the first half ring 43 by the spring element 45 in order to balance the pressure difference that acts across the first half ring.

Figure 12:
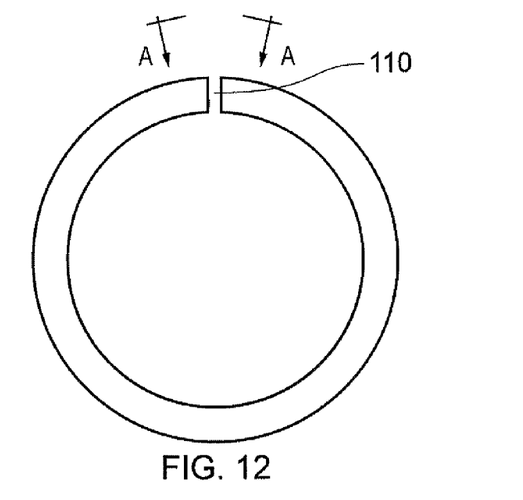
FIG. 12 shows a schematic transverse cross-section through the carbon ring or one of the carbon ring halves of the seal of FIG. 6, 8 or 10.
Figure 13A:
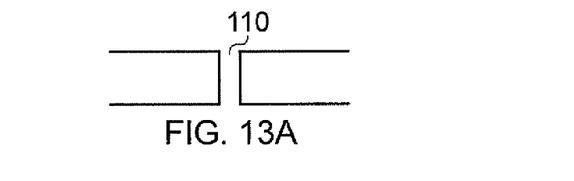
Figure 13B:
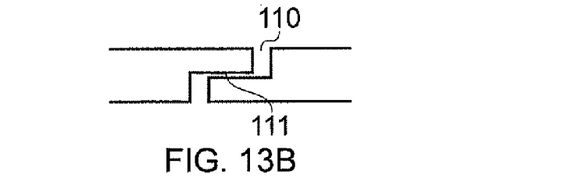

FIG. 12 shows a schematic transverse cross-section through the carbon ring 60 or one of the carbon ring halves 43, 74, 90 of the seal of FIG. 6, 8 or 10, and illustrates an optional radial slit 110 which extends from end to end of the ring, or ring half, to facilitate radial expansion (and thereby enhance contact with the outer shaft 68) and/or contraction (and thereby avoid excessive interference with the outer shaft) under centrifugal loading. FIGS. 13(a) and (b) are views from A-A in FIG. 12 of two possible configurations of the slit 110. In FIG. 13(a) the slit follows a straight end to end path. However, in the ring 60 of the seal of FIG. 6, the ring half 74 of the seal of FIG. 8, or the ring half 43 of the seal of FIG. 10 such a slit would provide a pathway for axial fluid leakage across the sealing contact with the outer shaft 68. Therefore, in FIG. 13(b) the slit follows a preferred end to end path which has a circumferentially extending section 111. The opposing faces of the ring or ring half across this section can maintain sliding contact with each other as the ring expands or contracts to reduce such leakage.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. For example, seals can be created without the lift generating formations. In such cases, the features providing the improved pressure balancing capability would lead to a reduction in the rubbing contact force. Various changes to the described embodiments may be made without departing from the spirit and scope of the invention.

The invention claimed is:

1. An intershaft seal assembly comprising:
an intershaft seal; and
an inner coaxial shaft and an outer coaxial shaft which rotate relative to each other, the intershaft seal being located in an annular space between the inner coaxial shaft and the outer coaxial shaft and maintaining an axial pressure differential between a fluid pressure on a first side of the intershaft seal assembly and a fluid pressure on an opposite, second side of the intershaft seal assembly, the intershaft seal comprising:
a sealing ring which is coaxial with the inner coaxial shaft and the outer coaxial shaft, the sealing ring having a first end face and a second end face, the first end face and the second end face being axially spaced from one another; and
a first runner and a second runner, which project outwardly from and extend circumferentially around the inner coaxial shaft and which sandwich the sealing ring therebetween, the first runner forming a first annular sealing interface with an inboard portion of the first end face of the sealing ring and the second runner forming a second annular sealing interface with the second end face of the sealing ring, an outer edge of each of the first annular sealing interface and the second annular sealing interface being at the fluid pressure of the fluid on the first side and the second side, respectively, of the intershaft seal assembly, wherein the outer coaxial shaft is stepped to define a first inwardly facing surface and a second inwardly facing surface spaced from the first inwardly facing surface and having a larger diameter than the first inwardly facing surface, the first end face of the sealing ring is stepped such that the inboard portion of the first end face is axially spaced from an outboard portion of the first end face, the outboard portion being outboard of the inboard portion, the inboard portion and the outboard portion have a first outwardly facing surface therebetween, the outboard portion of the first end face and the second face have a second outwardly facing surface therebetween having a larger diameter than the first outwardly facing surface, one or more fluid passages extend from the second end face to the outboard portion of the first end face to produce a fluid pressure on the outboard portion of the first end face which is equal to the fluid pressure on the second side of the intershaft seal assembly, and sealing contact of the sealing ring with the outer coaxial shaft is formed at the first outwardly facing surface to maintain the fluid pressure differential between the fluid pressure on the outboard portion of the first end face and the fluid pressure on the first side of the intershaft seal assembly.

2. The intershaft seal assembly according to claim 1, wherein the sealing ring is a unitary body.

3. The intershaft seal assembly according to claim 1, wherein the sealing ring has a first half which provides the inboard portion of the first end face and a second half which provides the outboard portion of the first end face and the second end face, the first half and the second half being spring loaded relative to each other such that the first half and the second half are urged away from each other.

4. The intershaft seal assembly according to claim 1, wherein the sealing ring is formed of carbon.

5. The intershaft seal assembly according to claim 1, wherein, in use, the sealing ring is urged centrifugally into sealing contact with the outer coaxial shaft at the second outwardly facing surface.

6. The intershaft seal assembly according to claim 1, wherein the one or more fluid passages are formed in the sealing ring.

7. The intershaft seal assembly according to claim 1, wherein the first annular sealing interface and/or the second annular sealing interface is configured to generate, in use, fluid-dynamic lift which prevents or reduces sliding contact between the sealing ring and the first runner and/or the second runner, respectively, across the first annular sealing interface and/or the second annular sealing interface.

8. The sealing ring of the intershaft seal of the intershaft seal assembly of claim 1.

9. A method for maintaining an axial pressure differential between the inner coaxial shaft and the outer coaxial shaft, the method comprising placing the intershaft seal of the intershaft seal assembly of claim 1 in the annular space between the inner coaxial shaft and the outer coaxial shaft, wherein a relatively high fluid pressure on the first side of the intershaft seal assembly and a relatively low fluid pressure on the second side of the intershaft seal assembly are maintained.

10. The intershaft seal assembly of claim 1, wherein a second sealing contact of the sealing ring with the outer coaxial shaft is formed at the second outwardly facing surface.

11. The intershaft seal assembly according to claim 1, wherein the one or more fluid passages are formed in the sealing ring.

12. The intershaft seal assembly according to claim 1, wherein the sealing ring has a first half which provides the inboard portion of the first end face and a second half which provides the outboard portion of the first end face and the second end face, the first half and the second half being spring loaded relative to each other such that the first half and the second half are urged towards the first runner and the second runner, respectively.

13. The intershaft seal assembly according to claim 1, wherein the sealing contact of the sealing ring with the outer coaxial shaft is formed at the first outwardly facing surface and the first inwardly facing surface.

14. The intershaft seal assembly according to claim 11, wherein the one or more fluid passages extend from a position on the second end face which is radially outwards of the second annular sealing interface.

* * * * *